US007577910B1

(12) United States Patent
Husemann et al.

(10) Patent No.: US 7,577,910 B1
(45) Date of Patent: Aug. 18, 2009

(54) METHOD AND APPARATUS FOR PROVIDING A MORE POWERFUL USER-INTERFACE TO DEVICE WITH A LIMITED USER-INTERFACE

(75) Inventors: Dirk Husemann, Adliswill (CH); Michael Moser, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 09/613,113

(22) Filed: Jul. 10, 2000

(30) Foreign Application Priority Data

Jul. 12, 1999 (EP) .................................. 99113414

(51) Int. Cl.
G06F 3/00 (2006.01)

(52) U.S. Cl. ...................... 715/744; 715/745; 715/746; 715/747

(58) Field of Classification Search ................ 345/716, 345/719, 720, 721, 723, 730; 715/744–749
See application file for complete search history.

(56) References Cited

U.S. PATENT DOCUMENTS

| 6,173,316 | B1 * | 1/2001 | De Boor et al. ............. 709/218 |
| 6,216,158 | B1 * | 4/2001 | Luo et al. .................... 709/217 |
| 6,446,096 | B1 * | 9/2002 | Holland et al. .............. 715/513 |
| 6,456,892 | B1 * | 9/2002 | Dara-Abrams et al. ........ 700/83 |
| 6,466,971 | B1 * | 10/2002 | Humpleman et al. ........ 709/220 |
| 6,502,000 | B1 * | 12/2002 | Arnold et al. ................. 700/83 |
| 6,509,913 | B2 * | 1/2003 | Martin et al. ................ 345/762 |
| 6,560,640 | B2 * | 5/2003 | Smethers .................... 709/219 |
| 6,792,605 | B1 * | 9/2004 | Roberts et al. .............. 719/313 |

FOREIGN PATENT DOCUMENTS

| JP | 07-254920 | 10/1995 |
| JP | 10-162060 | 6/1998 |
| JP | 10-240833 | 9/1998 |
| JP | 11-027290 | 1/1999 |
| JP | 11-031114 | 2/1999 |
| JP | 11-161321 | 6/1999 |
| JP | 2002-509669 | 3/2002 |
| WO | WO 95/28673 | 10/1995 |
| WO | WO 98/59284 | 12/1998 |

OTHER PUBLICATIONS

European Search Report, Application No. EP 99 111 3414, Mar. 21, 2000.
Jaap Haartsen, "Bluetooth—The universal radio interface for ad hoc, wireless connectivity", Ericsson Review No. 3, 1998.
Christer Erlandson and Per Ocklind, "WAP—The wireless application protocol", Ericsson Review No. 4, 1998.

* cited by examiner

*Primary Examiner*—Ba Huynh
(74) *Attorney, Agent, or Firm*—Brian P. Verminski, Esq.

(57) ABSTRACT

A method and apparatus for controlling a computer device with a limited user-interface via a remote computer device having a more powerful user interface. Both computer devices are interconnected via a wireless communication channel and both computer devices support a common communications protocol. User-interface information is sent from the computer device with a limited user-interface to the remote computer device to provide a user-interface at the remote computer device for receiving user input at the remote computer device. The user input controls the computer device with a limited user-interface to execute commands therein corresponding to the user input.

26 Claims, 10 Drawing Sheets

```xml
<?xml version="1.0"?>
    <!DOCTYPE WML SYSTEM "wml.dtd">
    <WML>
      <TEMPLATE>
        <DO TYPE="HELP" LABEL="help"> <GO URL="#help"/> </DO>
      </TEMPLATE>
      <CARD NAME="General settings" NEWCONTEXT="TRUE">
        <BR ALIGN="CENTER"/>
        Welcome to
        <BR ALIGN="CENTER"/>
        <BIG><B>SONY CD-Player 990X</B></BIG>
        <BR/> <BR/> <BR/>
        Please select the function you want to configure:<BR/>
        <A TITLE="set/edit CD labels">CD labels<GO
                    URL="#CD_names"/></A>
        <BR/>
        <A TITLE="select play mode">Play mode<GO
                    URL="#play_mode"/></A>
      </CARD>
      <CARD NAME="CD_names">
        <BIG><B>CD names:</B></BIG>
        <BR/>
        Enter a name for the currently inserted CD:
        <BR/>
        <INPUT TYPE="TEXT" KEY="CD_NAME" FORMAT="MMMMMM"
                    EMPTYOK="TRUE"/>
        <DO TYPE="ACCEPT" LABEL="ok">
           <GO
URL="bluetooth://sony_cdp_990/cd_titles/add;$(CD_NAME)"/>
        </DO>
      </CARD>
      <CARD NAME="play_mode">
        <BIG><B>Play-modes:</B></BIG>
        <BR/>
        Select one of the following play modes:
        <BR/>
        <SELECT TITLE="play-modes:" KEY="PLAYMODE"
                    DEFAULT="Normal">
          <OPTION VALUE="Normal" TITLE="Normal"/>
          <OPTION VALUE="Random" TITLE="Random"/>
          <OPTION VALUE="Shuffle" TITLE="Shuffle"/>
          <OPTION VALUE="UserDef" TITLE="User-Defined"/>
        </SELECT>
        <DO TYPE="ACCEPT" LABEL="ok">
           <GO
URL="bluetooth://sony_cdp_990/playmode/select;$(PLAYMODE)"/>
        </DO>
      </CARD>
      <CARD NAME="help">
        Some help text here...
      </CARD>
    </WML>
```

FIG. 10

METHOD AND APPARATUS FOR PROVIDING A MORE POWERFUL USER-INTERFACE TO DEVICE WITH A LIMITED USER-INTERFACE

TECHNICAL FIELD

The present invention relates to computer systems which have a limited user-interface, such as hand-held pervasive computing devices, and in particular to a design for allowing easy interaction with such computer systems.

BACKGROUND OF THE INVENTION

Through relatively recent technological innovations, computer systems have become dramatically smaller and more portable. Even very powerful personal computers (PCs), for example, are small enough to sit on the desk at work. Smaller still are lap top computers and notebook computers. There are computer terminals which are small enough to be mounted in a vehicle, such as a delivery truck. Still smaller are hand held terminals, which are typically used for their portability features, allowing a user to carry the terminal in one hand and operate it with the other.

In addition, there is a trend toward offering consumers electronic devices that include some sort of computer system, e.g., a microprocessor. Usually, these computer systems not only control the operation or function of the consumer device, but also provide some interface for a user or operator to control certain functions or parameters according to actual needs. It is in the nature of these consumer devices that they do not have a full user-interface like a computer with display and keyboard. It is not likely that a dishwasher, for example, will ever have such a full user-interface. In some cases the interface is limited due to space constraints (a typical example for this is a wrist watch), while in other cases the interface is limited to keep the cost of manufacturing low, while still in other cases the processing power of the computer system, or the constrained memory space, limits the interaction between the user and system.

Many of today's devices have an inadequate user-interface. A typical example is a compact disk (CD) player which allows programming of CD titles using a small four button-control. Programming of such a CD player is very cumbersome because one needs to use the buttons to move through the entire alphabet to select letters and/or numbers. Another example is a wrist watch that allows the user to enter phone book entries, appointments, and to-do items. Typically, the keyboard includes a very limited number of keys. Furthermore, the display is small and its resolution limited. Certain keys have to be pressed several times to reach special characters, or to activate special functions. Yet another example is a personal digital assistant (PDA) with a touch sensitive screen. In this case the screen occupies most of the device's surface and there are very few buttons, if any. Some functions are easily accessible using a pointing device, but other functions have to be selected or activated flipping through several layers of menus, for example. Other examples are telephones, vending machines, microwave ovens, mobile phones, etc. For the purposes of the present description these devices are referred to hereinafter as user-interface limited devices.

Currently there are a few approaches using a personal computer (PC) to run better user-interfaces, e.g. the "Nokia Cellular Data Suite" for mobile phones allows the entry of phone book data. The Cellular Data Suite is a hardware and software package from Nokia designed for cellular phones. Another example is a wrist-watch that has an IR-communication feature (such as the Casio PC Unite Data Bank Watch, HBX-100B-1) used to connect to a PC.

There are many other examples of user-interfaces that are severely lacking for various reasons, the most prominent of which are size and cost constraints. Often such user-interface restrictions make the respective devices less useful for their owners than they could be.

It would thus be useful to have a way to unleash the full potential of all these devices and to program and configure them much more conveniently, thereby making them more useful to their users.

There is growing demand in the industry to offer devices that are 'open' in the sense that a user has access via an interface to the device's processor or other components. An ideal 'open' device would be fully controlled by the user, preferably within well-defined rules to prevent misuse or destruction of the device itself.

In addition, there are a growing number of devices that are network enabled, which means that they can communicate with one or more other devices via a network. This can be achieved using physical connections, such as cables or fibers, for example. As these devices get smaller, however, it becomes desirable to replace the physical connections with wireless connections (e.g. body networks, radio frequency connections, or infrared connections), since physically connecting the devices by means of cables or fibers severely reduces the efficiency gained by making the units smaller. Ad-hoc wireless connections are required where devices move around, enter an area and exit the area. The term ad-hoc refers to the need for frequent network reorganization.

In addition, there are many different known communications protocols or standards that have been developed and designed (and continue to be developed and designed) directed at communication between devices or subsystems. Hereinbelow, some wireless communications protocols or standards will be mentioned. There are many fiber or cable-based, standardized approaches that are suited for such communication as well.

GTE Corporation has developed a short-range radio-frequency (RF) technique which is aimed at giving mobile devices such as cellular phones, pagers and hand-held personal computers (PCs) a smart way to interact with one another. GTE's technique is tentatively named Body LAN (local area network). The original development of Body LAN was via a wired vest with which various devices were connected (hence the name Body LAN). This then developed into to an RF connection.

Xerox Corporation has developed a hand-held computing device called PARC TAB. The PARC TAB is portable yet connected to the office workstation through base stations which have known locations. The PARC TAB base stations are placed around the building, and wired into a fixed wired network. The PARC TAB system uses a preset knowledge of the building layout and the identifiers of the various base stations to determine the strongest base station signal for a PARC TAB portable device. A PARC TAB portable device has a wireless interface to the base stations. The PARC TAB system assumes that the PARC TAB portable device is always connected to the network infrastructure. The location of each portable PARC TAB device is always known to the system software. The base stations establish regions and are connected to power supplies. PARC TAB communication systems have a star topology.

In an attempt to standardize data communication between disparate PC devices, several companies, including Ericsson, IBM, Intel, Nokia, and Toshiba have established a consortium to create a global standard for wireless RF-based connectivity between fixed, portable and mobile devices. There are many other companies adopting the proposed standard. The proposed standard is called Bluetooth and comprises architecture and protocol specifications ranging from the physical layer up to the application layer. The Bluetooth standard contemplates allowing users to connect a wide range of devices easily and quickly, without the need for cables, expanding communications capabilities for mobile computers, mobile phones and other mobile devices. The Bluetooth operating environment is not yet fully defined, but similarities are expected with the IrDA (Infrared Data Association) specification and the Advanced Infrared (AIr) specification. It is not unreasonable to expect that the Bluetooth standard will eventually incorporate aspects of the IEEE standard 802.11 and/or HIPERLAN, as promulgated by the European Telecommunications Standards Institute (ETSI).

Bluetooth radio technology provides a standard protocol suitable for forming small private ad-hoc groupings of connected devices away from fixed network infrastructures. Bluetooth makes a distinction between a master unit—which is a device whose clock and hopping sequence are used to synchronize all other devices—and slave units in the same network segment. In other words, the Bluetooth approach is centralized. A query-based discovery design is used for finding Bluetooth devices with an unknown address. Queries are also centralized at a registry server. Further details can be found in Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE.

HomeRF (based on Shared Wireless Access Protocol (SWAP)) is another example of a prospective operating environment protocol which can be used to connect devices. A HomeRF Working Group was formed to provide the foundation for a broad range of interoperable consumer devices by establishing an open industry specification for wireless digital communication between PCs and consumer electronic devices anywhere in and around the home. The working group, which includes the leading companies from the personal computer, consumer electronics, peripherals, communications, software, and semiconductor industries, is currently developing a specification for wireless communications in the home called the SWAP. The HomeRF SWAP system is designed to carry both voice and data traffic and to interoperate with the Public Switched Telephone Network (PSTN) and the Internet. It operates in the 2400 MHz band and uses a digital frequency hopping spread spectrum radio. The SWAP technology protocol being developed is being derived to some extent from extensions of existing cordless telephone (DECT) and wireless LAN technology to enable a new class of home cordless services. It envisions supporting both a time division multiple access (TDMA) service to provide delivery of interactive voice and other time-critical services, and a carrier sense multiple access/ collision avoidance (CSMA/CA) service for delivery of high speed packet data. The SWAP system is contemplated to operate either as an ad-hoc network or as a managed network under the control of a connection point. In an ad-hoc network, where only data communication is supported, all stations will be equal and control of the network will be distributed between stations. For time critical communications such as interactive voice, the connection point—which provides the gateway to the PSTN—will be required to coordinate the system. Stations will use the CSMA/CA to communicate with a connection point and other stations. Further details about HomeRF can be found at the Home Radio Frequency Working Group's web site http://www.homerf.org. The SWAP specification 1.0 is incorporated by reference in its entirety.

There are several other known protocols and techniques that allow communication between two or more devices. The above described Bluetooth radio technology and HomeRF approach are prominent wireless examples.

SUMMARY OF THE INVENTION

It is therefore an object of the present invention to provide a method and apparatus for providing a more powerful user-interface to a device with a limited user-interface.

It is another object of the present invention to provide a method and apparatus for simplified and improved user interaction with a device with a limited user-interface, also referred to herein as an "interface limited device."

To achieve the above objects, a method and apparatus in accordance with the present invention includes a standard wireless communications protocol which allows a user to interact with or control an interface limited device wirelessly using a second (independent) device.

In other words, the present invention provides a more powerful user-interface to an interface limited device by interfacing it with a more powerful device in its vicinity. The more extensive input capabilities of the more powerful device (second device) are employed to control certain aspects of the limited user-interface device (first device).

The method in accordance with the present invention includes the steps of transmitting user-interface information from the first device to the second device; providing a user-interface at the second device corresponding to the user-interface information; receiving user input via the user-interface at the second device; transmitting user command information corresponding to the user input from the second device to the first; and executing the corresponding user commands at the first device.

DESCRIPTION OF THE DRAWINGS

The above and other objects, features and advantages of the present invention will become more apparent in light of the following detailed description of an exemplary embodiment thereof taken in conjunction with the attached drawings in which:

FIG. 10 is a Wireless Markup Language (WML) document describing the user-interfaces of FIGS. 3-5.

DESCRIPTION OF PREFERRED EMBODIMENTS

Figures 1, 2:
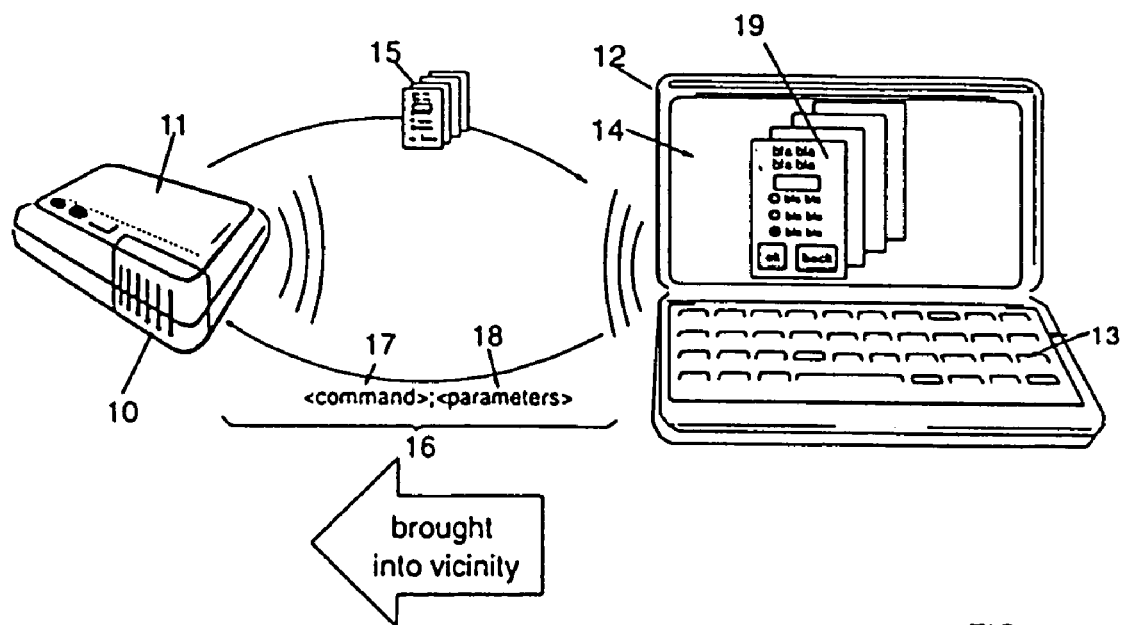
FIG. 1 is a block diagram illustrating a typical environment wherein the present invention is utilized, in accordance with an embodiment of the present invention.
FIG. 2 is an illustrative representation of an exemplary execution tree in accordance with an embodiment of the present invention.

For the purpose of the present description, a network can be anything that allows a first device (the limited user-interface device) to communicate with a second device (which has a more powerful user-interface). A simple point-to-point link, a local area network (LAN), a GSM telephone link, an ethernet link or any other kind of link is hereinafter referred to as network. This network can either be a physical network or a wireless network (e.g., infrared (IR), radio-frequency (RF), such as HomeRF). The network may be completely isolated from any other network, or it might comprise one or more access points which provide the devices with access to another network.

The specific range that constitutes a wireless network in accordance with the present invention depends on actual implementation details. Generally, a wireless network can be described as having a coverage area between a few square meters and several thousands of square kilometers (e.g., in case of a GSM network). Under certain circumstances the communication range may go even further. The two devices—which communicate with each other have to be "in vicinity," which means that they have to be sufficiently close or otherwise interconnected in order to be able to exchange information with each other.

The devices need to be able to transmit and/or receive information via the network. Accordingly, two devices that communicate with each other must support the same communication protocol.

Well suited to support communication between devices is the Bluetooth communications design, which is described in the Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE. This reference is incorporated herein by reference in its entirety.

It is assumed, that once the devices are in vicinity of each other, a wireless communication path between these devices can be established—e.g. using magnetic field (near field/5-30 cm), infrared (IR), e.g., IrDA (0.5-2 m) or AIr (1-10 m), or low-power radio-frequency (RF) communication, e.g. Blue-Tooth (~1-10 m), or HomeRF (~1-50 m), just to list some examples of wireless schemes that are suited.

Of course such a vicinity requirement may also be accomplished via some global addressing design and a local proxy (e.g. an IR-beacon on each ceiling or a BlueTooth "relay" in each room or home) connected to a network (e.g. the Internet), thus effectively allowing remote control of a variety of devices from virtually anywhere in the world. Such a global addressing design is also required in a GSM-based implementation of the present invention.

It is understood by those skilled in the art that at the present time many of the protocols that are suited for use in wireless communications systems are still in draft status. The present design is independent of any one particular protocol and can be used in connection with many such protocols. Accordingly, someone having ordinary skill in the art is able to implement the present design in existing protocol environments as well as in protocol environments under development or yet to be developed.

The present design can be used anywhere inside, i.e. warehouses, on manufacturing floors, in offices, on trading floors, in private homes, and outside of buildings, in cars and trucks, in airplanes, just to mention a few examples.

Two devices can be connected using a 1:1 connection. Possible media are infrared and magnetic fields. The procedure to setup such a 1:1 connection can be similar to today's setup of a connection between two IrDA enabled devices, i.e. the devices must be positioned such that their communication subsystems (transceivers) can "see" each other. Then both systems are triggered to start a connection setup procedure until a wireless communication channel is established.

Likewise, two devices can be connected using a shared medium. A possible shared medium is RF (Radio Frequency). Possible systems could be based on technology and protocols like BlueTooth, DECT, and HummingBird.

Details about HummingBird transceivers are given in "Hummingbird Spread Spectrum Transceiver Operator's Manual", Rev. 24 Jun. 1998, XETRON Corp., Cincinnati, Ohio, USA Details concerning the basic problems regarding identification and addressing, initial (resource) discovery, matching and selection of communication partners, etc. depend on the medium used and the communications protocol employed.

When referring to a device, any kind of device is meant that can establish a network connection to another device. Examples of devices are: laptop computers, workpads, nodepads, personal digital assistants (PDAs), notebook computers and other wearable computers, desktop computers, computer terminals, networked computers, internet terminals and other computing systems, set-top boxes, cash registers, bar code scanners, point of sales terminals, kiosk systems, cellular phones, pagers, wrist watches, digital watches, badges, and smart cards. Other contemplated devices include: headsets, Human Interface Device (HID) compliant peripherals, data and voice access points, cameras, printers, fax machines, keyboards, joysticks, HiFi systems, audio (sound) cards, loudspeakers, amplifiers, video cards, kitchen appliances, tools, sensors such as smoke and/or fire detectors, and virtually any other digital device.

Other examples of devices that can be used in connection with the present invention are, personal effects being equipped with computer-like hardware, such as a "smart wallet" computer, jewelry, or articles of clothing. In addition to a "smart wallet" computer, there are a number of other variations of wearable computers. A "belt" computer is such a variation which allows the user to surf, dictate, and edit documents while they are moving around. Yet another example is a child's computer which is comparable to a personal digital assistant for grade-school children. The child's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (i.e. vending machines, ticketing machines, automated teller machines, etc.) may include the present invention.

It is also assumed that a device, as used in connection with the present invention, includes a minimum amount of processing power to enable it to participate in the design according to the present invention. These devices are thus also referred to as computer devices. Most, if not all, of the above listed devices may be viewed as being devices with limited user-interfaces. This may even be the case for a personal computer which has a display and a keyboard. There is still room for improvement in such a computer's interface, e.g., by adding speech input. There are no absolute criteria which can be used to decide whether a particular device is a device with a limited user-interface or not. There is always room for improvement and thus any computer device per se is assumed to be a device with a limited user-interface. The present invention may be implemented where there is a second computer device that has a more powerful user-interface, more adequate, more convenient, or superior user-interface capabilities. Not all aspects of the user-interface have to be superior or more powerful. It is sufficient, for example, if there is a first device which has no speech input (i.e. it has a limited user-interface) and a second device which has a speech input. The present invention may also be implemented, as selected by a user, to control the second computer device that has a more powerful user-interface via the device with the limited user-interface, if so desired as a users convenience dictates.

Some of the above-mentioned devices can be regarded hereinafter as the device (controller) whose interface is used to interact with the user-interface limited device (controlled device).

A computer device is generally referred to as a computer device with a limited user-interface where, for example, one or more of the following applies: the user-interface is inadequate for the tasks required; the user-interface is small and difficult to read, understand, or hear; the user-interface presents an inconvenience to the user; there is no graphics capable display (e.g. a text-only display); there is a restricted number of input keys, or input keys which are too small; there are too many functions which are mapped to a limited number of buttons and thus imposes complicated control structures that make it difficult to operate the device without prior extensive study of a user's manual, especially for seldom used or advanced functions; the user-interface is not powerful enough, making its use to slow, or has low resolution, or the like.

Devices with a more powerful user-interface capabilities generally fulfill, for example, one or more of the following criteria: there is a larger screen; there is a screen with graphics capability; there is a full keyboard; there is a pointing device; there is a voice-input feature and so forth.

The user-interface may be any kind of interface used for interaction between a user and the device, such as a display, keyboard, mouse, track point, audio output, speech recognition input, tactile input, etc.

A typical environment where the present invention is used is illustrated in FIG. 1. There is a first computer device 10 which has a limited user-interface 11 (in the present example the user-interface comprises a simple display and a few buttons). When there is a second computer device 12 in vicinity of the first device 10 that has superior user-interface capabilities (keyboard 13 and display 14) than that of the first device 10 and which may be controlled or configured, and assuming that the two devices 10 and 12 communicate with each other, the superior user-interface capabilities of the second device 12 may be employed to facilitate and speed-up the use of the first device 10 by transmitting a more powerful user-interface (user-interface description 15) stored in the first device 10 to the second device 12. The first device 10 and second device 12 communicate via a wireless communications channel 16. A more powerful user-interface is a user-interface that is easier to use, i.e. "richer" (in that it has more features), more intuitive, faster, or the like. The user-interface description 15 is then processed by the second device 12 such that the more powerful user-interface 19 is then displayed and operated via the second device 12. Then user-inputs and/or commands and/or parameters are sent back to the first device for execution. In the present example, commands 17 (<command>) and parameters 18 (<parameters>) are sent back to control or operate the first device 10 in response to commands input by a user on the second device 12.

The first device 10 may provide its user-interface in some standard format (herein referred to as a user-interface description 15) to be broadcast to all other devices, such as the second device 12, appearing in vicinity. If the user-interface description 15 is sufficiently small then the entire interface description can be transmitted quickly and stored at these other devices.

If there are a plurality of devices ("controllable" devices) with limited user-interfaces in vicinity of a second device with a superior user-interface, then the user requests some visual verification on the second device listing all "controllable" devices (e.g., in the form of a list, a menu, a graph, or the like) from which he/she can then choose one device with a limited user-interface and request its user-interface to be displayed, thereby beginning the aforementioned process, according to the present invention.

The communication path 16 between the first device 10 and second device 12 is used to transfer data for a specific command from the first device 10 (thus becoming the "controlled device" or server) to the second device 12 in vicinity (the controller or client/user agent). The second device 12 provides the user-interface description 15 to the user. This can be done by displaying it (reference number 19) to the user on display 14, for example. Then, the second device 12 awaits the user's interaction.

The user enters responsive commands, e.g. by picking his/her choice from a presented menu, or supplies input by keying-in the requested data. In doing so the user makes use of the controller-device's more powerful user-interface capabilities (be it a larger keyboard 13, voice-recognition, color-display 14, or the like). Information describing the user's interaction, selection, or input is then sent back to the controlled device 10 in the form of "requests" (i.e. commands 17 and—optionally—one or more parameters 18) via the communication path 16.

The controlling device 12 is not required to have any prior knowledge of the features and the user-interface of the controlled device 10. No special software needs to be pre-installed because everything is dynamically downloaded from the controlled device 10 when required. Any Laptop or PDA that happens to be handy, or maybe even a public kiosk system, could quickly be used as a "user-interface server" without installing anything and without leaving any noticeable traces on that system (except maybe a few modified cache-entries in the system's memory). However, there are of course some prerequisites which must be fulfilled by all involved devices to allow the aforementioned interfacing.

One such prerequisite requires that both devices have a standardized procedure and format of describing sufficiently rich user-interfaces such that it is possible to render typical user-interface controls, i.e. display input-prompts, selection-menus, help-texts or other text-messages to visualize a device's status, etc. Suitable candidates for such user-interface description formats are: HTML (the HyperText Markup Language used in the WWW), WML (Wireless Markup Language defined by the WAP forum), other, still-to-be-defined XML (Extensible Markup Language) dialects, and X-windows protocol.

One preferably uses a user-interface description which is optimized so that transmissions between devices are efficient. The user-interface description is preferably flexible and extensible.

In addition, the devices must be able to detect each other's presence, exchange basic capability descriptions and—on demand—be able to setup a sufficiently reliable point-to-point connection amongst each other. This basic capability description can be a simple flag or bit combination, for example, which describes standard types of services. These standard types of services may be predefined such that they can be identified by a simple flag or bit combination. The basic capability description can also be any other kind of information which is well suited to identify one or several of the services offered. In addition to identifying a type of service, one might have to set or define certain parameters and options (referred to hereinafter as parameters).

Thus, there are certain common requirements between devices. The devices, for example, will initiate a resource discovery design and exchange a capability and/or device-class description for describing their respective service offerings once they detect their mutual presence. A device includes the ability to detect the presence of other potential devices in vicinity by receiving communications from the other potential devices, and upon detection of other devices in vicinity, upload information describing their service offerings. In addition, it is advantageous if a device is able to signal its presence to other devices and to download its own service offering information or (broadcast it) to the other devices. The broadcast of service information may optionally be done using a different protocol layer than the layer eventually used for sending user initiated command information to remotely control the controlled device 10. In another approach, the service information is inherently known based on which service is offered and by what device (i.e., all devices XYZ offer the services A and B, and all devices MNO offer the services C and D, for example).

An example of a design for broadcast and/or discovery of service offering information is addressed in a co-pending European patent application entitled "Service Advertisements in Wireless Local Networks", filed on 25 Jan. 1999, currently assigned to the assignee of the present application, the contents of which are hereby incorporated by reference. According to this design, each device takes turns broadcasting a list of services (among which could be the ability to send user-interface description and receive the corresponding commands) available. The general approach is that a group of devices will take turns broadcasting a list of service offerings (hereinafter referred to as user-interface description) available. By using variable transmission delays that are reset when other simultaneous device broadcasts are received, and adjusting the distribution of these delays, new devices in vicinity are quickly identified, and devices leaving vicinity are quickly identified as no longer in vicinity. This design provides for the formation of small separate ad-hoc groupings of connected devices. Local networks are established immediately (ad-hoc) when needed, and change as the grouping varies according to the devices currently in vicinity. A network of all eligible devices in vicinity (devices that will allow themselves to be networked) can be established while allowing devices to be added or removed accordingly.

The present invention implements any suitable design used for broadcasting and/or discovery of service offerings of the devices as described above, without being limited to any one particular design. What is required is that a device having a more powerful user-interface receive and store service offering information describing those devices in vicinity having a limited user-interface. The service information is updated frequently, since the wireless networks composition may change frequently.

In one example, a resource discovery design may allow two devices within vicinity to determine whether certain services are available and what kind of services are available. A first device maintains a record with information about services and associated identifiers about a second device, which acts as a service-providing device. The first device may comprise a service discovery module which maintains a record with information about services and associated identifiers, and a list of identifiers about service-providing devices. The service discovery module enables the first device to distinguish a service offered by a service-providing device in vicinity from a service offered by a service-providing device not in vicinity. The resource discovery design may be defined such that, when used in combination with a wireless communications protocol, it controls certain services or tasks carried out or assigned to a device with a superior user-interface which is in vicinity of the device with a limited a user-interface requesting the service.

The device's capability description may include a basic initial message (a "pointer") which is stored at the receiver side as part of each device's description, for example.

The controlled device sends user-interface descriptions in some standardized format and receives and interprets inputs, commands and/or parameters sent back from the controlling device.

The controlling device understands and is able to receive the user-interface descriptions and to make them accessible to the user on demand or automatically, e.g. by displaying a menu or a list of all devices currently in vicinity. The controlling device then forwards commands to the controlled device.

An example of the present invention is illustrated in connection with a preferred embodiment hereinbelow. In the following description, the invention is implemented and described in a communications system using WML. The benefits of WML include: WML is a small, simple, XML-based "language"; WML has a relatively small and simple browser, that will soon be available on many mobile devices; WML's "deck-of-cards" metaphor maps perfectly to familiar configuration paradigms ("property-sheets" or "tabs"); WML can be encoded very compact using either binary WML or tokenized WML. Most tags become single-byte items and strings are collected in a string-table. In the example given below the original WML file is 1.5 kB, while the tokenized form is only 652 bytes, even without compressing the string table. If the string table were compressed (e.g., using Lempel-Ziv, the same algorithm used in the popular .zip or .gzip tools), the resulting files are even smaller. In addition, WML has built-in variables replacement functionality; and WML has timer functionality.

In order to signal that certain commands (and parameters) are to be sent to the controlled device, the WML-browser (or its underlying communication stack) must recognize URLs that use a special "protocol".

The protocol may be based on existing protocol, like:

HTTP (HyperText Transport Protocol, i.e. the Internet-WWW protocol) requests as specified in [RFC1738] and [RFC2068], in example:

http://<host>/<path>[;<params>][?<query>][#<anchor>]

FTP (file transfer protocol) in example:

ftp://<host>/<path>/<filename>

The gopher protocol, in which there have already been suggestions to extend the notation using additional schemes in example:

gopher://<host>/<path>/<filename>

The "file:"-protocol, which has already been widely adopted and incorporated into most WWW-browsers in example:

file://<host_name>/<local_path>/<filename>

(Note: the //<host_name> fragment is optional and—if not present—defaults to "this host" or "local host" which accesses a local file rather than a file or resource located at a remote server).

Similarly suggested, but not yet adopted, is a protocol that allows the control of and communication via "local" devices (serial ports, printer ports, smart-card readers, USB-ports, etc.) using for example:

device://<portname>/<cmd>[;<params>][?<query>][#<anchor>]

e.g. device://COM1/setbaudrate;19200 to change the first communication port's serial speed to 19200 baud/s.

In addition, the present invention proposes a <comm> protocol to send commands to communicating devices that are "attached" using some short-range communication means (like IR or RF) using the following protocol: <comm>://<device_id>[:<portnr>]/<prefix>/<cmd>[;<params>.] <comm> refers to the network or communication means over which this command/request is to be sent, e.g. "IrDA" or "Bluetooth", "Hummingbird", etc. A parameter <device_id> is needed to provide communication means, which support multi-party communication (i.e. not only 1:1 communication like IrDA V1) to address a specific device. An optional parameter <portnr> may also be added to specify a specific port, where more than one communication channel exists between communicating devices, or to select a non-default channel for special purposes (e.g. for device monitoring, diagnosis, configuration, etc.).

This device-id may be derived from the concatenation of a manufacturer identification and a model identification (e.g. "sony_cdp_990X") with some user-specified arbitrary name or physical location (e.g. "mmoser_livingroom'")

A parameter <prefix> (which may have the same syntax as a URL-<path>) is used to group commands into some tree-structure, e.g. if one looks at a printer's menu-tree (execution tree) as shown in FIG. 2.

A parameter <cmd> (or the last path-fragment) specifies the actual command, while a parameter <params> describes optional parameters of the above command. Examples implementing this protocol are represented below: bluetooth://sony_cdp_990_mmoser_livingroom/cd_titles/add;BMW: Exodus bluetooth://sony_cdp_990_mmoser_livingroom/play_mode/select; shuffle.

To perform resource discovery, a communicating device sends a command string in the following format: wml_ui=<device_id>/[<path>]/<command>[;<parameters>]

An example implementing this protocol is shown below:

wml_ui=sony_cdp_990_mmoser_livingroom/main_menu

Resource discovery is performed so a device may describe its resources to its peers. In the above example wml_ui is a predefined service name (standardized) and sony_cdp_990_mmoser_livingroom/main_menu is an initial URL. The URL decomposes into a "host name" sony_cdp_990_mmoser_livingroom which is a logical name that has to be mapped to the physical address of the device, and the remainder (command and optional parameters) which is the actual request to be sent to the device. In the above example, the command "main_menu" is issued (without parameters) to return to the initial main menu.

The above URL is stored as part of the description that all devices maintain about other devices currently in vicinity. If the user-interface description file size is small enough, the device may send the entire user-interface description immediately following the resource discovery phase.

Devices with a means to display the user-interface description act as service providers and controllers for devices with a limited user-interface. If there are a plurality of devices with limited user-interfaces in vicinity of a device that serves as the controller, the plurality of devices together with their user-interface capability-description may be displayed on the controller's screen for selection. The controller's display may typically include a system-menu with a selection button labeled "act as user-interface for a nearby device". Clicking the selection button pops up a list of "controllable" devices. The user then picks a controllable device from that list, whereupon the user-interface-URL (wml-user-interface-URL) is transmitted to the selected device to carry out the method according to the present invention.

The transmission of the user-interface-URL triggers the transfer of the main-control menu of the controlled device from the controlled device to the controlling device (controller). WML uses a "deck of cards" metaphor, which maps to "property sheets", a visualization technique that is often used to edit object attributes and parameters.

Figure 3:
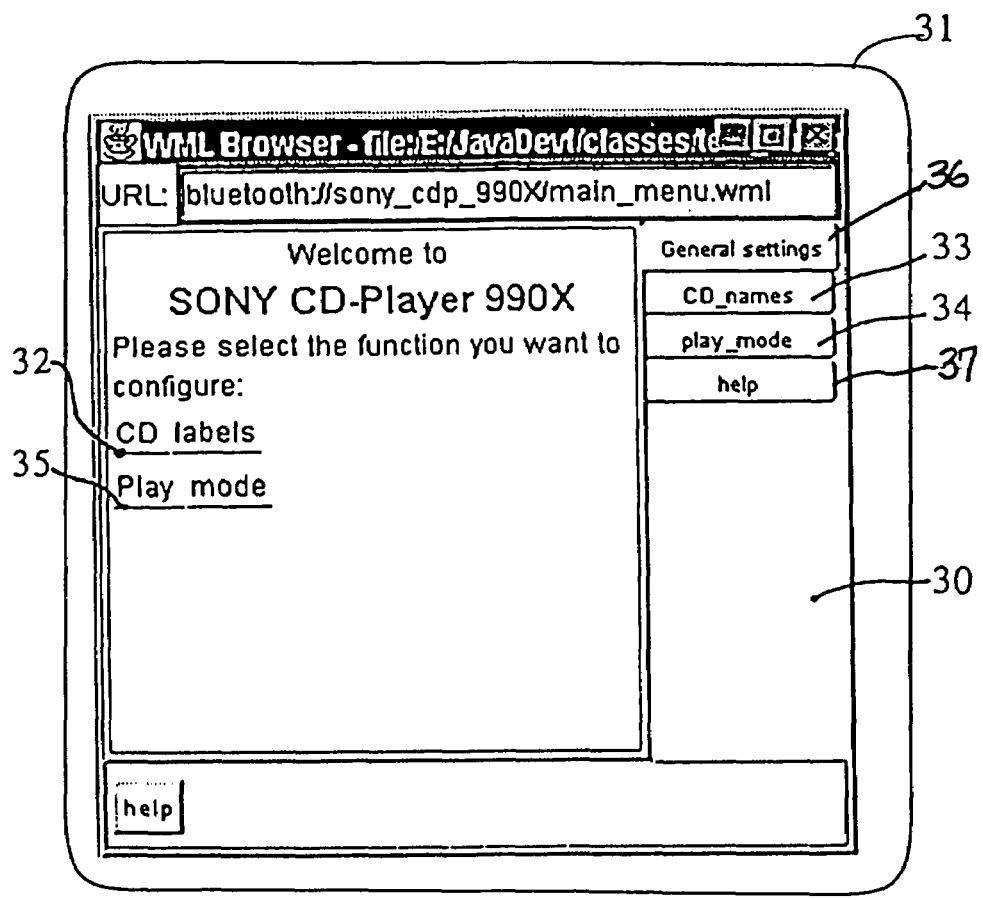
FIG. 3 illustrates a first user-interface window in accordance with an embodiment of the present invention.
Figure 4:
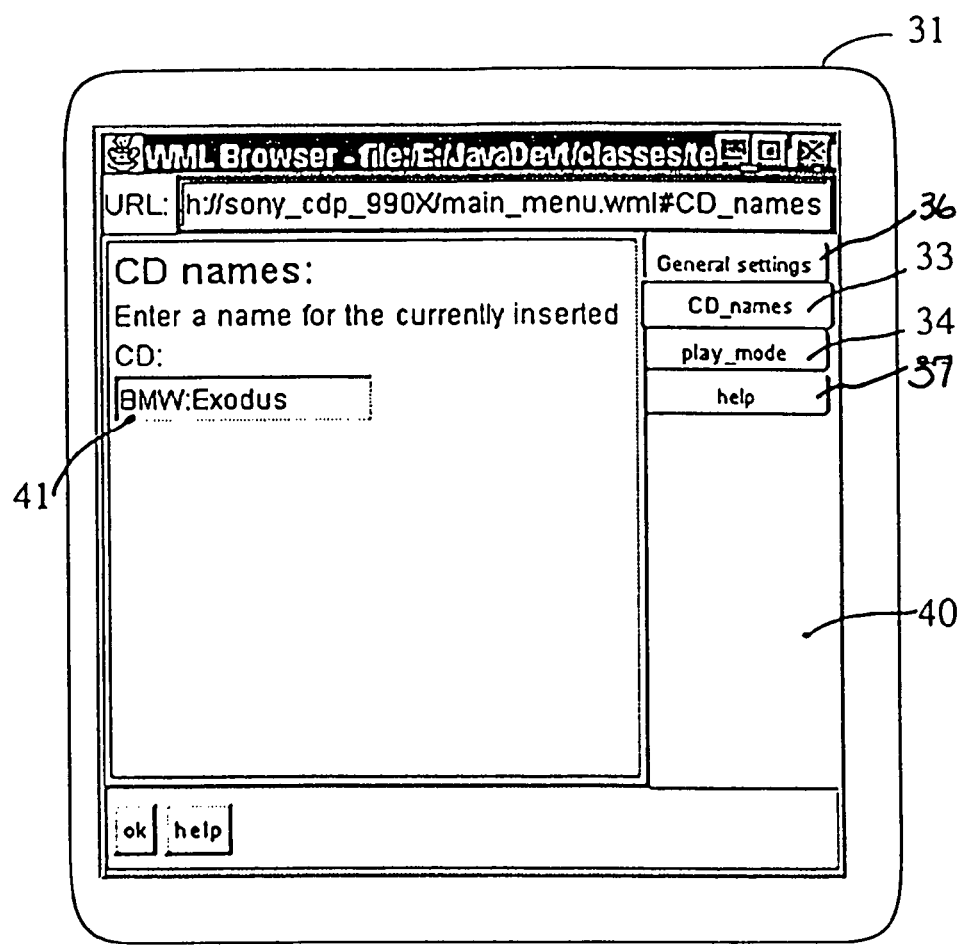
FIG. 4 illustrates a second user-interface window in accordance with an embodiment of the present invention.
Figure 5:
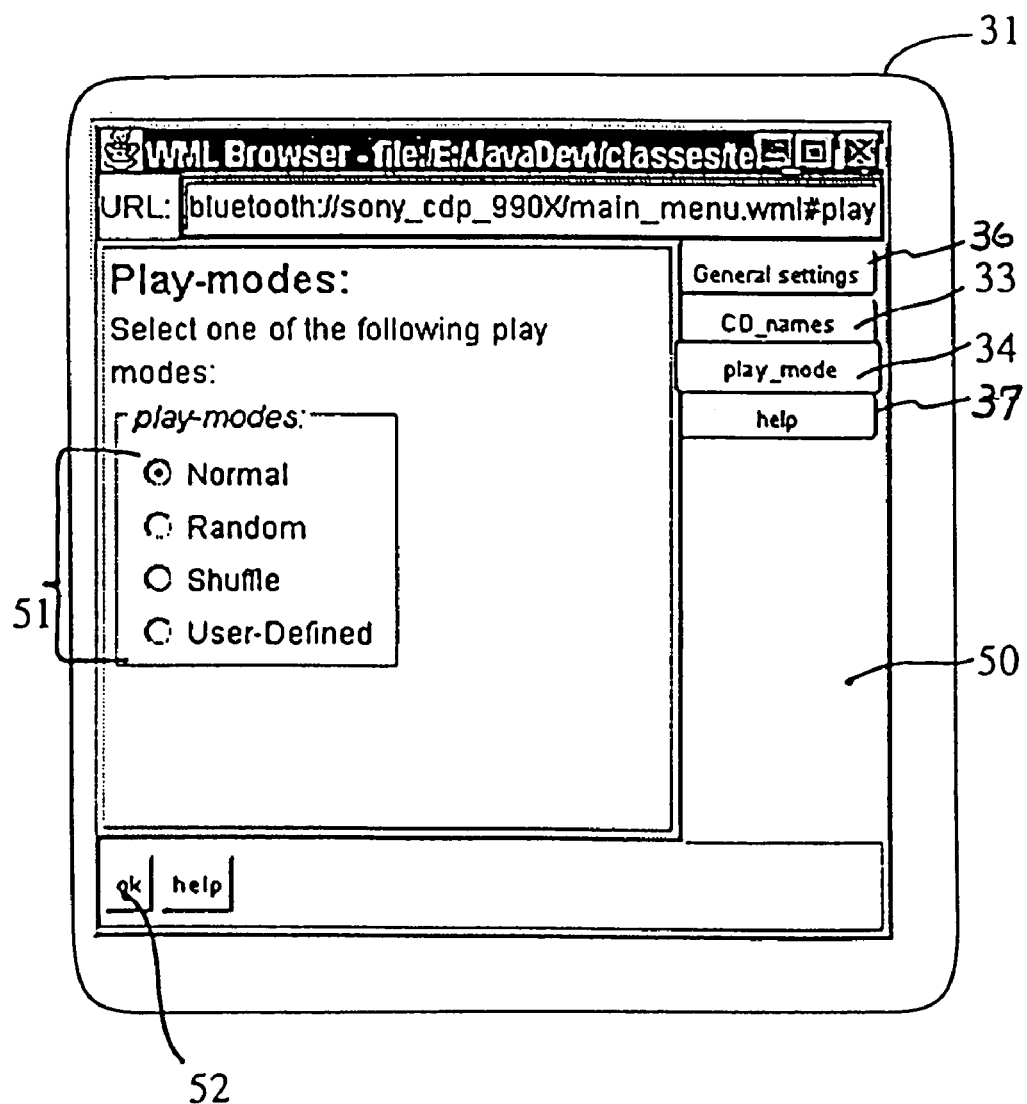
FIG. 5 illustrates a third user-interface window in accordance with an embodiment of the present invention.

An example is illustrated in FIGS. 3-5, where a CD-player is controlled by a controller having a display 31. The user-interface 30 shown contains a deck with only 4 cards: a welcome & overview card 36, a card to edit CD names 33, a card to select the play mode 34 and a generic help card 37. The corresponding WML document is shown in FIG. 10.

When a WML-browser is used by the controller, the deck layout is displayed as window 30 on the screen 31 of the controller, as shown in FIG. 3. When, for example, the user clicks on the CD-labels link 32 or the user selects the "CD-names"-tab 33, a card 40 to edit CD-titles is displayed, as shown in FIG. 4. Here the user may enter a CD-name in an insert field 41 using the input facility of the controller device, e.g., a full-blown keyboard, pen-input, voice-input, or the like.

Selecting the play-mode link 35 (or play_mode-tab 34) pops up a window 50 as shown in FIG. 5. Again, the user selects from the different play modes by clicking on one of the radio buttons 51 using the controller device's input facility.

The commands and parameters are transmitted on user command, e.g., the user clicks the OK-button 52 on the CD-player play-modes window 50 of FIG. 5, instructing the controller's browser to submit the following URL, in example:

bluetooth://sony_cdp_990/playmode/select;Normal

The above URL would switch the play mode of the CD player to "Normal". Based on the protocol (here "bluetooth") the controller device's communication stack recognizes that this is not a normal request, to be sent out via TCP/IP and the Internet, but rather that this request must be intercepted and forwarded to the local (bluetooth) communication stack.

The host specification of the URL is then used to address the specified device (here a "Sony CD-player model 990") and the remaining URL-part (the optional path, the command and the optional parameter(s)) are then sent to the specified device.

The addressed device must have a simple "command-interpreter" that is able to recognize and execute received commands by analyzing submitted URLs, i.e. extracts and recognizes certain command strings plus optionally separates and converts parameters, etc. The complexity and robustness of this interface is completely up to the manufacturers discretion, and therefore may vary according to manufacturer and model number.

The user may optionally receive a visual or audible confirmation when he/she presses a button or clicks on a link and thus "submits a request" to the controlled device. For this reason the controlled device may react (this is an optional step) and return some response to the submitted request, since simply receiving a time-out message in the browser with no success/failure indication whatsoever is generally not sufficient.

The flexibility, size, and complexity of this response is completely up to the manufacturers discretion, the devices capabilities, and resources. For example, the device may: return data to display a specific card confirming the reception of the command and describing the results of its execution; return data to display the complete user-interface-"deck" again with certain texts or default choices now adapted according to the status changes caused by the previous command; or return just a minimal OK, or error, page depending on the command's result. The user may then navigate back to the control stack by pressing "return" in the browser. Many other responses or combinations of the above responses are possible.

Figure 7A:
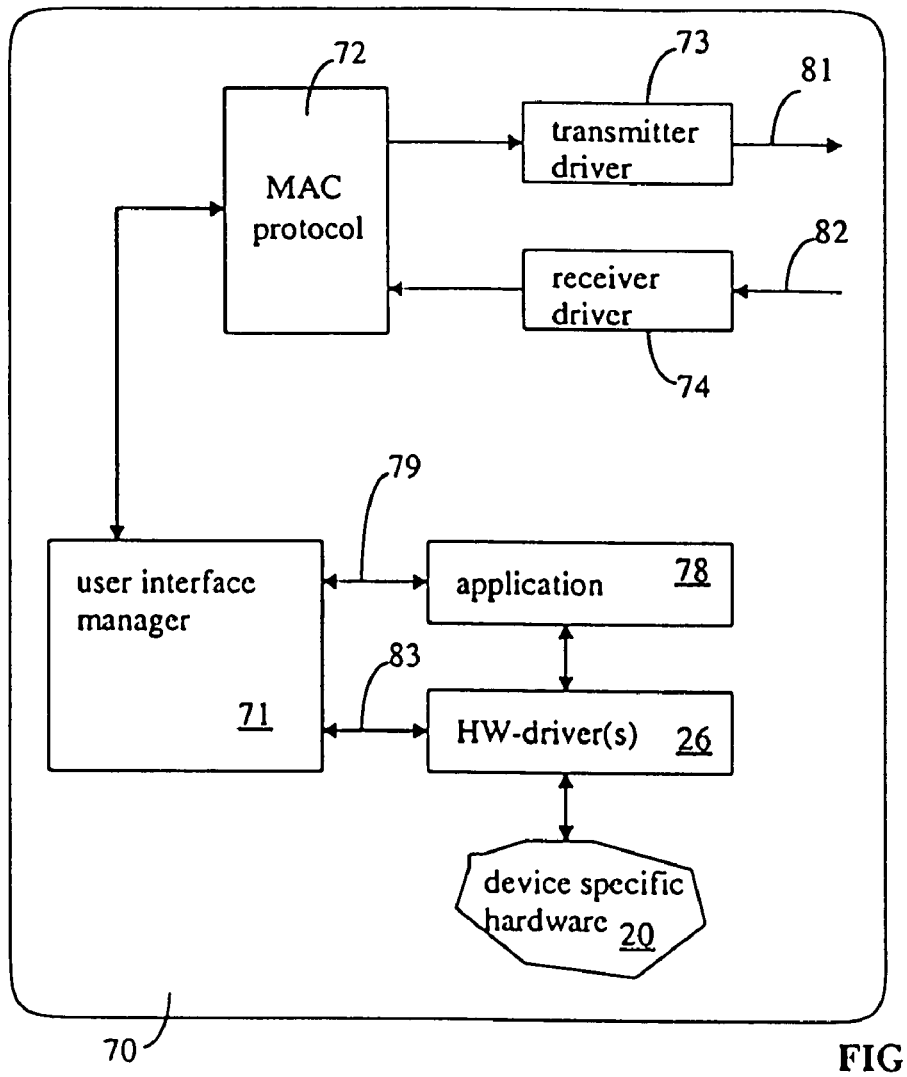
FIG. 7A is a block diagram illustrating a first device (with a limited user-interface) in accordance with an embodiment of the present invention.
Figure 7D:
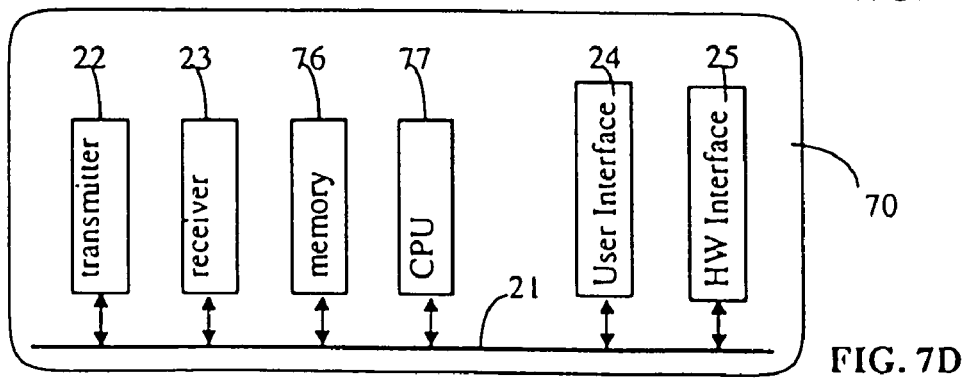
FIG. 7D is a block diagram illustrating the hardware layer of a first device in accordance with an embodiment of the present invention.

One exemplary implementation of the present invention is described in connection with FIG. 7A. FIG. 7A is a block diagram illustrating the components, both logical components and physical components, of a device 70 with a limited user-interface. FIG. 7D illustrates building blocks of the hardware layer. The device 70 comprises a transmitter driver 73 for sending information via an output channel 81 to another device, such as a device with more powerful user-interface capabilities, and a receiver driver 74 for receiving information from other devices via input channel 82. The channels 81, 82 may be any kind of channels, such as an IR, RF, or body network channels, for example. These channels do not have to be the same. It is conceivable, for example, that the output channel 81 is an infrared channel whereas the input channel 82 is a RF channel.

The transmitter driver 73 and receiver driver 74 communicate with a medium access control (MAC) unit 72. The MAC layer is well defined by international standards (cf. ISO OSI (Open Standards Interconnection) reference model as described in A. S. Tannenbaum's book "Computer Networks", for example). The MAC unit 72 is preferably a conventional unit employed in communication systems to control the MAC layer. Note that a MAC layer is a logical division, and would be only logically divided from other parts of the protocol implemented at 71 on the same physical device. The MAC unit 72 may be employed to detect and/or avoid collisions between transmitted data packets received simultaneously from different devices. In the present embodiment the MAC unit 72 is used to send and receive packets. In many cases, such a MAC unit 72 may not be required.

Device 70 and it's components may be powered via a power plug, a solar cell, a battery, or any other suitable means which are purposely left out for clarity.

With reference to FIG. 7D, the device 70 may comprise a bus 21 enabling communication between some of the device's components/units, such as the central processing unit (CPU) 77, memory 76, the communication hardware 22, 23 and any other device specific hardware 20 through a hardware interface 25. The device 70 may also have a user-interface unit 24 for interaction with a user (e.g. a small LCD display and some input keys).

During remote access, user-interface information is supplied from a user-interface manager 71 to the MAC unit 72 and transmitted to the (remote) controlling device via transmitter driver 73 and channel 81. User-interface information comprises any information needed by the controlling device with the more powerful user-interface capabilities in order to provide a superior user-interface to the controlled device for a user. Depending on the implementation, the user-interface information may be information that describes a full user-interface (see item 19 in FIG. 1), or describes a partial user-interface (item 63 in FIG. 6).

Commands entered at the controlling device by the user are received via channel 82 by the receiver driver 74 and forwarded to MAC 72 and to user-interface manager 71. To control the device 70 the user-interface manager 71 may communicate directly (item 83) or indirectly via an optional application programming interface 79 (API) and a device specific application 78 with hardware drivers 26, and consequently with device specific hardware 20 that provides and embodies a device's purpose and/or functionality (be it a video cassette recorder, a coffee machine, a printer, a stereo device, etc.). The actual activity or functionality of the device 70 is independent of the present design; using the present design provides that this activity may be controlled and/or monitored from another device.

Here, the MAC 72, the user-interface manager 71 and the application 78 are logical constructs. They may be implemented on separate devices or incorporated into a program stored in memory 76. If incorporated into a program, the device 70 may physically be the same as other devices, except for the fact that it comprises the above-mentioned program. The program comprises instructions that when processed by the CPU 77, instruct the device 70 to perform the operations necessary to implement the present invention.

The user-interface manager 71 exchanges the user-interface information, allowing the user-interface to be provided to the remote controlling device and control information and/or parameters to be received from the device in response to user input.

Figure 8:
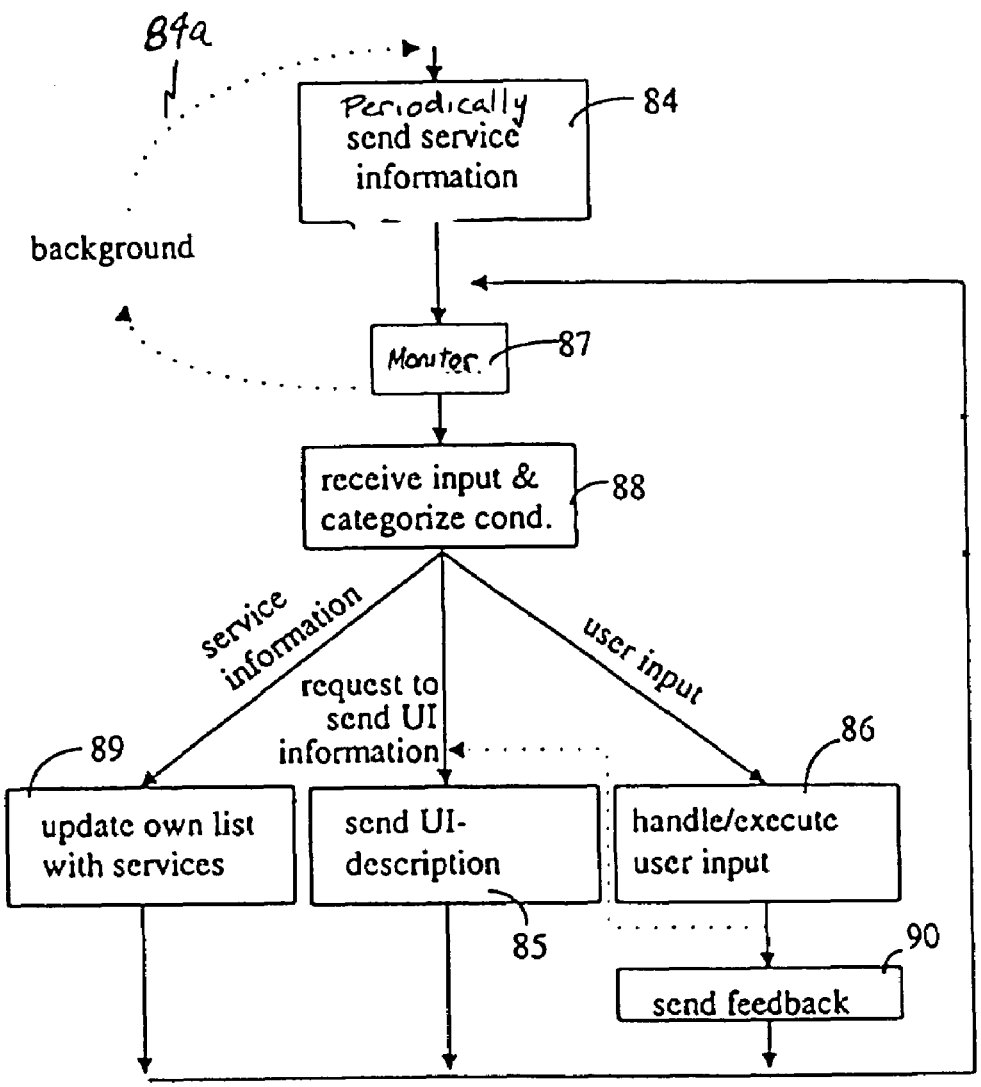
FIG. 8 is a flowchart illustrating the method of the present invention in a first device, in accordance with an embodiment of the present invention.

Referring now to FIG. 8, a flow chart is used to describe the steps that are performed by a device 70 with a limited user-interface. The device 70 also transmits service information (service announcements) to one or more devices within vicinity periodically in step 84. This service announcement process may optionally run in the background, as indicated by the dashed loop 84a. When the device receives information from another device (second device), it categorizes the information into one of several categories. In the present example there are three categories: service information; request to send user-interface (UI) information; and user input. When the input contains service information, then the received information is used to update the device's own list of services in step 89. The service information may be used by the second device to transmit information about its capabilities. The service information is stored in a list for later retrieval. Alternatively, the information may be retrieved only if needed, for example. When the input is identified to be a request to send user-interface (UI) information then the device sends its UI information to the second device in step 85. Finally, when the information comprises a user input received from the second device, then the device 70 processes and/or executes this user input in step 86. In an optional step 90, a confirmation signal is returned to the second device to indicate to the user that the controlled device processed or executed the command. Alternatively (see the dashed arrow at the lower right-hand side) the device 70 may, if instructed, send an entire or partial UI description again which is updated to reflect results or status changes caused by the prior command. Finally, the device 70 returns to monitoring mode in step 87, and awaits additional information from the second device or any other device in vicinity.

The embodiment described in connection with FIG. 8 implements a procedure where the second device (i.e., the device with a superior or more powerful user-interface) triggers the device 70 with a limited user-interface to send user-interface information, which may, for example, be initiated when a user points the second device into the direction of the computer device 70 with limited user-interface, or simply brings the second device in vicinity of the device 70.

Figure 7B:
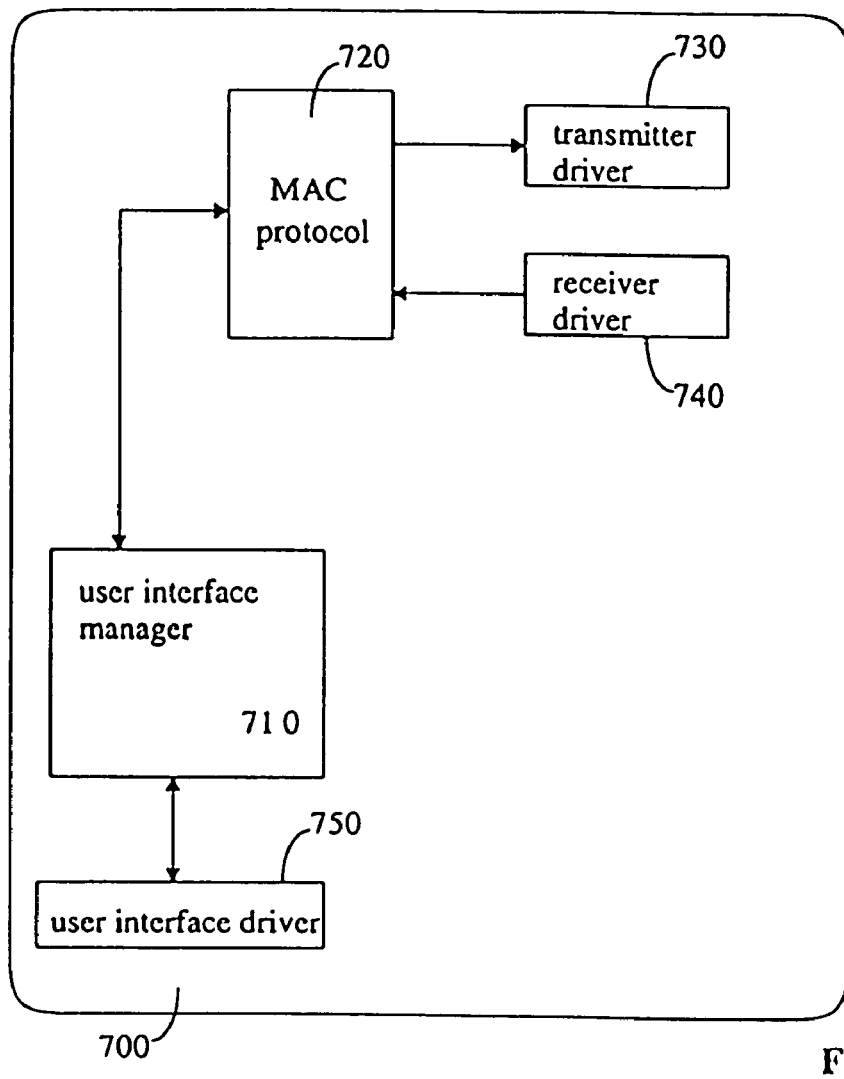
FIG. 7B is a block diagram illustrating a second device with a more powerful user-interface) in accordance with an embodiment of the present invention.
Figure 7C:
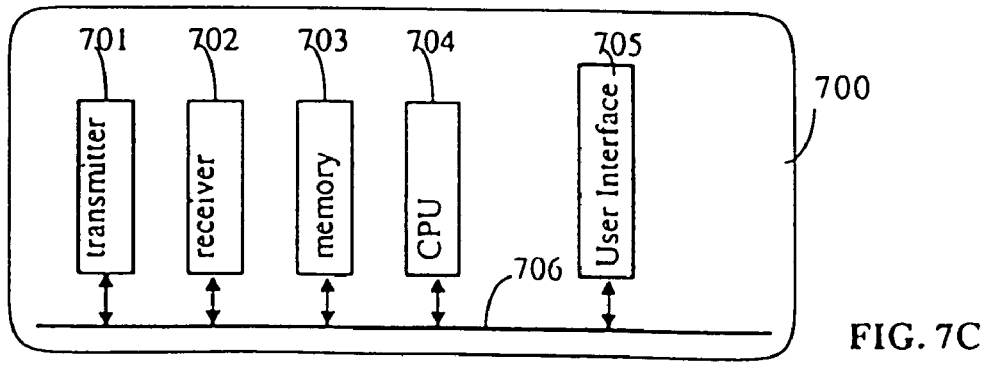
FIG. 7C is a block diagram illustrating the hardware layer of a second device in accordance with an embodiment of the present invention.

With reference now to FIGS. 7B and 7C, an embodiment of a controller device 700—i.e. a device that has a more powerful user-interface—is illustrated. FIG. 7B illustrates typical logical and software-layer building blocks and FIG. 7C illustrates building blocks of the hardware layer. As shown in FIG. 7B, the controller device 700 comprises a MAC protocol handler 720, a transmitter driver 730, and a receiver driver 740 for communication with a remote device (not shown). In addition, there is a user-interface manager 710 and a user-interface driver 750 to communicate with the user-interface.

As illustrated in FIG. 7C, the device 700 comprises a bus 706 (e.g. a back plane bus or a cable bus) for interconnecting a transmitter 701, receiver 702, memory 703, CPU 704, and user-interface 705 connected to a display and/or keyboard or, pointing device, for example.

Figure 9:
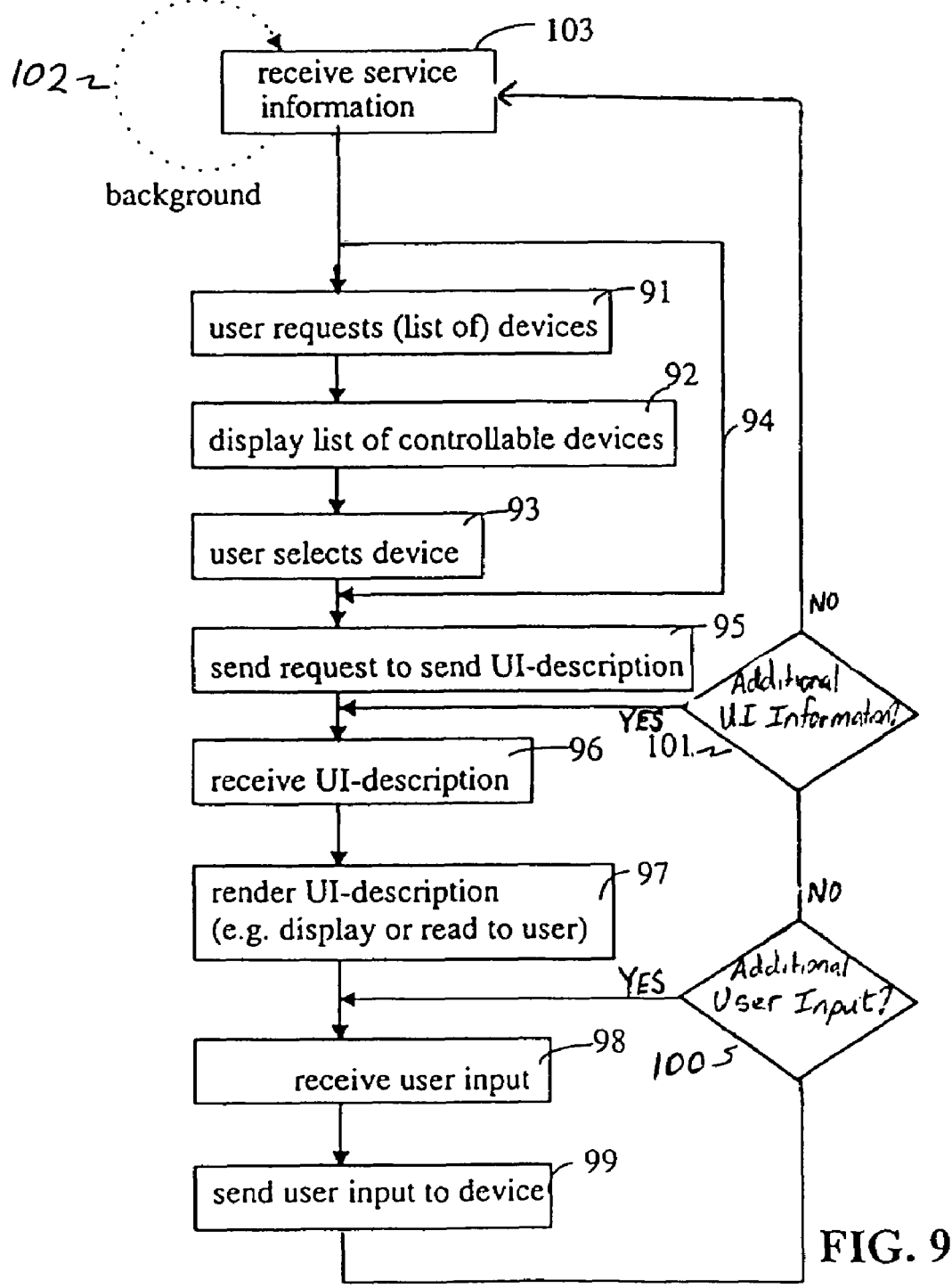
FIG. 9 is flowchart illustrating the method of the present invention in a second device to control a first device in accordance with an embodiment of the present invention.

FIG. 9 is a flow chart illustrating the corresponding steps performed by the controller device 700 during operation. The controller device 700 background monitors 102 and receives service information from a device with a limited user-interface in step 103. If there is a plurality of computer devices with limited user-interfaces (controllable devices) within vicinity of the controller device 700, then a list of these controllable devices is displayed for the user in step 92. In step 91 the user may also optionally request the list. The user then selects a controllable device he wants to control (controlled device) or interact with from the list in step 93. If there is only one controllable device, or if the controller device 700 otherwise knows which controllable device the user wants to interact with, then steps 91-93 may be bypassed as indicated by arrow 94. Next, a request to send user-interface information is transmitted to the controlled device in step 95. The controlled device responds by sending the requested user-interface information, as illustrated in step 85 of FIG. 8. After the user-interface information is received by the controller device in step 96, a corresponding user-interface is displayed to the user in step 97. This may, for example, be done by displaying the user-interface to the user, by reading text to the user, by printing some information, etc. The controller device 700 then waits to receive user input in step 98, and corresponding commands are then sent back to the controlled device in step 99. A confirmation signal may optionally be received from the controlled device and provided to the user (not illustrated in FIG. 9). The controller device 700 then waits for additional user input for a predetermined period of time in step 100, returning to step 98 if additional user input is received. If no additional user input is received during the predetermined period in step 100, the controller device 700 then awaits additional user-interface information in step 101 for a predetermined period of time. If the additional user-interface information is transmitted the interface information is received, returning to step 96. If the user-interface information is not received, the controller device 700 returns to background monitoring 102 to receive service information in step 103.

In an alternative embodiment, the controlled device initiates the process. In this case, the controlled device sends user-interface information to a particular second device. If there is a plurality of devices within vicinity of the controlled device, then the controlled device or the user selects one. Before user-interface information is sent out, the device or user may determine whether there is another device in vicinity which has the best user-interface. This may be done by simply looking at the information stored in a list of available devices in vicinity with corresponding services. If no list is maintained, the controlled device transmits the user-interface information hoping there is a device in vicinity which is able to receive and interpret the user-interface information. The second device receives the user-interface information and provides a corresponding user-interface to the user. The user then uses this user-interface to input information. The user's input is then sent to the controlled device where the input is processed and/or executed. In an optional step, confirmation feedback is returned to the second device to indicate to the user that the controlled device processed or executed the command.

Figure 6:
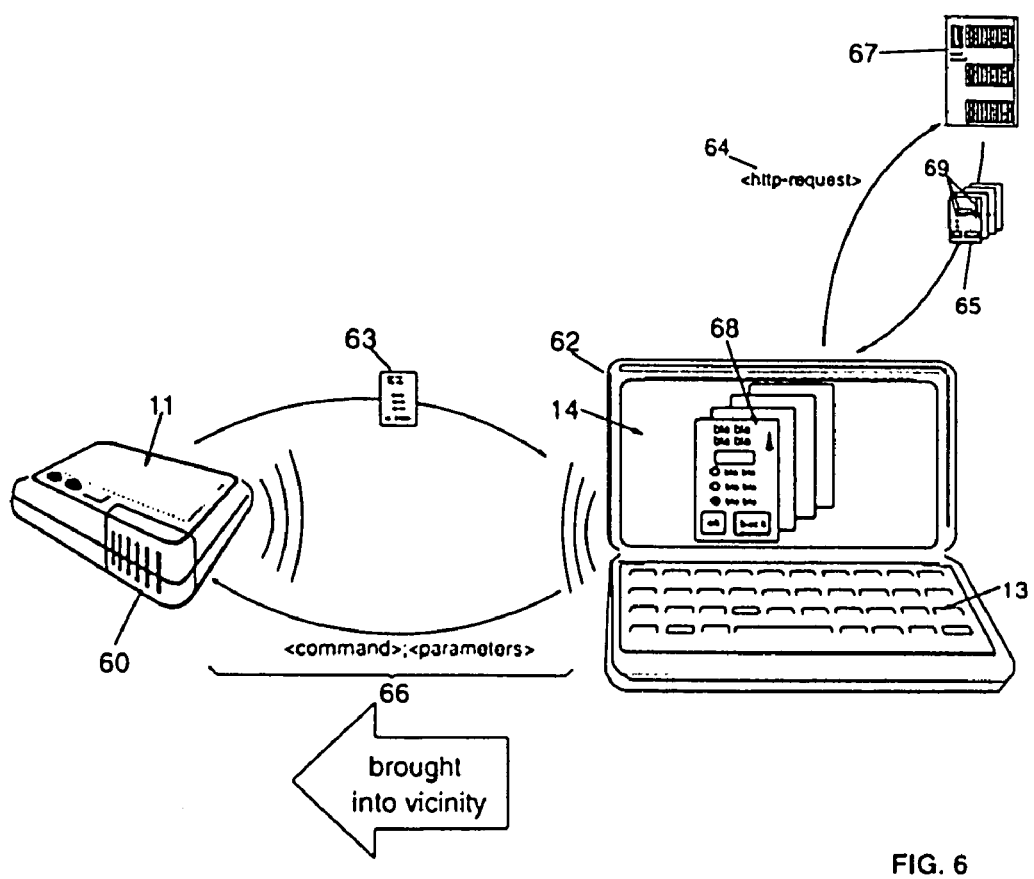
FIG. 6 is a block diagram illustrating another embodiment of a typical environment in which the present invention is utilized, in accordance with an embodiment of the present invention.

An extension of the above described design is described below with reference to FIG. 6. The user-interface source 67 and the command target 60 are separate, as illustrated in FIG. 6. The controlled device 60 does not necessarily have to supply the entire user-interface description (which could become quite large—e.g. when lots of graphical elements are employed) but only minimal required information. In this case, the device 60 just sends a partial user-interface 63 (e.g. a text-only version) via the wireless communications path 66 to the controller 62, or the controlled device 60 supplies only an initial user-interface description 63 (e.g. a URL) or "pointer".

The actual user-interface 65 or the additional information (e.g. graphics 69) are then retrieved from other locations, for example, a file pre-installed on the controller or a WWW server on the Internet, and combined into a unified user-interface presentation 68 on the screen 14 of the device 62. In the illustrated example the actual user-interface is fetched from a WWW server 67 using an HTTP request 64. This allows the user-interface description 63 stored in the device 60 to be very small and only requires the implementation of a simple command and parameter parsing capability in the device 60 itself.

Another, more complex user-interface implementation allows the controlled device to implement only basic commands, using scripting techniques. These commands are combined by the controller to form more powerful compound commands and also automate certain repetitive tasks. A browser equipped with some flexible scripting language would, for example, automate tasks like the following:

Ask the user to insert a CD

Once a CD is inserted, request and display the current CD's identification code

Search that CD's ID-code in a Web-based database (e.g. "CDDB")

Copy the title and author of that CD into the title field of the CD-player's User Interface and submit that request.

Start over.

Thus, the user simply inserts one CD after the other into a CD-player (controlled device in the present example) while the PC (controller device in the present example) searches and automatically programs the corresponding CD-labels into the CD-player.

The present invention may also incorporate the translation of user-interface controls. In this case, the controlling device acts as a format translator, i.e. converts user-interface elements to/from different formats or media. The controlling device may, for example, provide speech synthesis and "read" some text message to a vision impaired or occupied person (e.g. during car-driving). Similarly, spoken commands to enter data into an input field or activate a control-element (a spoken "button click") may be converted. Such conversion involves user-interface representation formats that do not make any assumptions about the actual physical user-interface capabilities available in a device, but rather specify abstract functional levels of controls, e.g. WML does not specify minimal display sizes in pixels nor require a minimum number of fonts to be available for menus and text-output, but rather specifies "selection", "input" and "activation" capabilities. Menu-texts may either be displayed or read to the user and the user can type his/her answer or simply speak to the device.

If a manufacturer relies on the fact that seldom used functions need not be controlled via a device's front-panel but rather using a better suited external device, the amount of user-interface code for complicated, seldom used functions can be drastically reduced, which yields much easier, less error-prone software development and consequently shorter time-to-market and considerable price benefits due to quicker development. A controllable device in accordance with the present invention is simpler and less expensive.

Given a minimal communication range (say 15-20 m), the device to be controlled need not even be in the same room. It could be in the basement or on the roof (e.g. heating, air condition, antennas, cable tuners, satellite receivers, etc.).

The standardized communication channel between a controlled device and a controller can be extended (this technique is usually known as "proxy") to allow the bridging of larger distances and to allow remote-control and remote-diagnosis capabilities. For example, building and heating control might require special knowledge such that even a good user-interface does not enable a customer to correctly adjust certain settings. By temporarily relaying the user-interface to a specialized firm, some external specialist may configure or diagnose a remote system. Such world-wide access to home equipment is convenient for a "normal" user, too, because it will allow the user to control home systems from a remote location.

HTML can optionally be used as the exchange format. This allows more flexible, more powerful user-interfaces but would be less elegant and compact than an WML implementation. Any other markup language may also be used.

If the host-device (the controller) supports drag-and-drop capabilities, this functionality may be exploited—e.g. to copy an appointment from a PDA's agenda to the downloaded user-interface of a wrist-watch. The drag and drop capabilities work between host-applications and downloaded user-interfaces, as well as between devices. If more than one device is currently controlled by the same controller, that host may act as an intermediate, i.e. one could drag and drop information between two controlled devices (e.g. copy a phone number stored in a wrist-watch to a mobile phone).

Many of the benefits of the present invention become obvious when reading the specification. The present design allows a user to make use of larger, better readable displays (e.g., a larger color graphics display), superior/faster input capabilities (e.g., a full-fledged keyboard, or pointing device), and better suited I/O interfaces (e.g. a printer or audio system). It is certainly easier to program a mobile phone or a wrist-watch using a PDA or a computer screen and a keyboard than keying-in data on a tiny numeric keyboard. According to the present invention, the user may use a mouse, pen, or any other pointing device provided by the controller device to control features of a device which lacks such a mouse, pen, or other pointing device.

The present invention may in part or as a whole be implemented by or on a special computer device or a general purpose computer device. This may be done by implementing the invention in some form of computer program. Computer program in the present context means an expression, in any language, code or notation, of a set of instructions intended to cause a computer device to perform a particular function either directly or after either or both of the following:

a) conversion to another language, code or notation; and b) reproduction in a different material form.

While the present invention has been described in detail with reference to the preferred embodiments, they represent more exemplary applications. Thus, it is to be clearly understood that many variations can be made by anyone having ordinary skill in the art while staying within the scope and spirit of the present invention as defined by the appended claims. Although specific terms are used herein, the description uses terminology in a generic and descriptive sense only and not for purposes of limitation.

The invention claimed is:

1. A method for controlling at least one first device having a limited user-interface by using at least one second device, wherein the first and second devices communicate via a wireless communication channel and support a common communications protocol, the method comprising the steps of:

transmitting the limited user-interface information from the at least one first device to the at least one second device;

providing an extended user-interface on the at least one second device, the extended user interface having more extensive capabilities than the capabilities of the limited user-interface of the at least one first device the extended user-interface utilizing the transmitted limited user-interface information and comprising extended functions so as to extend the capabilities of the limited user-interface;

accepting user commands input via the extended user-interface;

transmitting user commands from the second to the first device; and executing the transmitted user commands on the first device.

2. The method recited in claim 1, wherein the user-interface information is a standardized user-interface description.

3. The method recited in claim 1, wherein the second device transmits a list of available services to the first device prior to said first device transmitting user-interface information to said second device.

4. The method recited in claim 1, wherein the wireless communication channel is automatically established between the first device and the second device.

5. The method recited in claim 1, wherein the second device comprises a display for displaying said extended user-interface.

6. The method recited in claim 1, wherein the second device comprises a keyboard for accepting the user commands.

7. The method recited in claim 1, wherein a markup language is used for user-interface information.

8. The method recited in claim 7, wherein Wireless Markup Language (WML) is used as the markup language.

9. The method recited in claim 1, wherein the second device provides the extended user-interface by using browser software to display at least a portion of the user-interface information.

10. The method recited in claim 1, wherein a wireless session protocol is used for transmitting the user commands to the first device.

11. The method recited in claim 1, wherein a hypertext transport protocol (HTTP) is used for transmitting the user command information to the first device.

12. The method recited in claim 1, further comprising the step of sending a confirmation signal from the first device to the second device following the step of executing the-transmitted user commands.

13. The method recited in claim 12, wherein the confirmation signal indicates whether the execution of the transmitted user commands at the first device was successful.

14. The method recited in claim 1, wherein the wireless communications channel is initiated by the first device.

15. The method recited in claim 1, wherein, prior to said step of transmitting the limited user-interface information, the second device transmits a request signal to the first device requesting the limited user-interface information.

16. A system for remotely controlling devices, said system comprising:
- a first device comprising a limited user-interface, a first processor, a first transceiver, a first memory, and a first user-interface manager;
- a second device comprising a second processor, a second transceiver, a second memory, and a second user-interface manager; and
- a wireless communications channel for communication between the first device and the second device, wherein
    - the first user-interface manager transmitting the limited user-interface information to the second device via the first transceiver, the wireless communications channel and the second transceiver;
    - the second user-interface manager providing an extended user-interface having more extensive capabilities than the capabilities of the limited user-interface of the at least one first device, the extended user-interface utilizing the limited user-interface information and comprising extended functions so as to extend the capabilities of the limited user-interface;
    - the second device accepting user commands via the second user-interface;
    - the second computer device transmits user commands to the first device via the second transceiver, the wireless communications channel, and the first transceiver; and
    - the first device executes the user commands information received from the second device.

17. The system recited in claim 16, wherein the first transceiver and the second transceiver automatically establish the wireless communication channel between the first device and the second device.

18. The system recited in claim 16, wherein the second device further comprises a display that displays the extended user-interface.

19. The system recited in claim 16, wherein the second device further comprises a keyboard for accepting the user input.

20. The system recited in claim 16, wherein the second device provides the extended user-interface by using browser software to display the limited user-interface information.

21. The system recited in claim 16, whereby the second device further enables a user to initiate a request by the second device of the limited user-interface information from the first device.

22. The system recited in claim 16, further comprising a third device-comprising a third processor, a third transceiver, and a third memory storing part for storing the limited user-interface information.

23. The system recited in claim 22, wherein a first part of the limited user-interface information is transmitted by the first device to the second device and a second part of the limited user-interface information is transmitted by the third device to the second device.

24. The system recited in claim 23, wherein the first part of the limited user-interface information is a pointer identifying a portion of the third memory storing part where the second part of the limited user-interface information is stored.

25. A computer program device readable by a machine, tangibly embodying a program of instructions executable by the machine to perform method steps for instructing a device including a limited user-interface, a processor, a transceiver for interfacing through a wireless communications channel with a remote device, a memory, and a user-interface manager, to perform a method comprising the steps of:
- (a) transmitting the limited user-interface information through the wireless communications channel to the remote device;
- (b) receiving user input generated at the remote device via the wireless communications channel, said remote device providing an extended user interface, said extended user interface having more extensive capabilities than the capabilities of the limited user-interface of the at least one first device, said extended user-interface utilizing the received limited user-interface information and comprising extended functions so as to extend the capabilities of the limited user-interface;
- (c) executing the user input command; and
- (d) transmitting a confirmation signal to the remote device through the wireless communications channel.

26. A computer program device readable by a machine, tangibly embodying a program of instructions executable by the machine to perform method steps for instructing a device including user-interface manager, a processor, a memory, and a transceiver for interfacing through a wireless communications channel with a limited user-interface device, to perform a method comprising the steps of:
- (a) receiving limited user-interface information from the limited user-interface device through the wireless communications channel;
- (b) providing an extended user-interface under the control of the extended user-interface manager, said extended user interface having more extensive capabilities than the capabilities of the limited user-interface of the at least one first device, said extended user-interface utilizing the received limited user-interface information and comprising extended functions so as to extend the capabilities of the limited user-interface;
- (c) accepting user input commands via said extended user interface;
- (d) sending user input commands via the wireless communications channel to the limited user-interface device;
- (e) receiving a confirmation signal via the wireless communications channel from the limited user-interface device, said confirmation signal indicating that said input commands have been executed by the limited user-interface device; and
- (f) providing a notification to a user, said notification corresponding to the confirmation signal.

* * * * *